United States Patent
Martin et al.

(10) Patent No.: US 11,882,860 B2
(45) Date of Patent: Jan. 30, 2024

(54) VENTING FOR A COMBINATION COOKING SYSTEM

(71) Applicant: SharkNinja Operating LLC, Needham, MA (US)

(72) Inventors: Christopher T. Martin, Concord, MA (US); Michaela Dubeau, Uxbridge, MA (US); Adam Garland, Wakefield, MA (US)

(73) Assignee: SharkNinja Operating LLC, Needham, MA (US)

( * ) Notice: Subject to any disclaimer, the term of this patent is extended or adjusted under 35 U.S.C. 154(b) by 0 days.

(21) Appl. No.: 17/506,949

(22) Filed: Oct. 21, 2021

(65) Prior Publication Data

US 2023/0131171 A1    Apr. 27, 2023

(51) Int. Cl.
*A23L 5/10* (2016.01)
*A47J 37/06* (2006.01)
*A47J 27/086* (2006.01)

(52) U.S. Cl.
CPC .............. *A23L 5/17* (2016.08); *A47J 27/086* (2013.01); *A47J 37/0641* (2013.01); *A47J 37/0664* (2013.01); *A23V 2002/00* (2013.01)

(58) Field of Classification Search
CPC . A23L 5/17; A47J 27/08–0815; A47J 27/086; A47J 36/06; A47J 36/10; A47J 37/0623; A47J 37/0641; A47J 37/0664; A47J 2027/008
USPC ..................................... 99/467, 468; 426/523
See application file for complete search history.

(56) References Cited

U.S. PATENT DOCUMENTS

| | | | | |
|---|---|---|---|---|
| 2,600,714 A | * | 6/1952 | Wenscott | A47J 27/0806 277/648 |
| 6,116,151 A | * | 9/2000 | Fickert | A47J 27/0813 99/403 |
| 6,307,193 B1 | * | 10/2001 | Toole | A47J 36/06 219/735 |
| 8,747,933 B1 | * | 6/2014 | McGinn | A47J 27/08 220/573.1 |
| 2009/0020539 A1 | * | 1/2009 | Rhetat | A47J 27/0804 220/573.1 |
| 2020/0000263 A1 | * | 1/2020 | Peng | A47J 27/0802 |

(Continued)

FOREIGN PATENT DOCUMENTS

| | | | | |
|---|---|---|---|---|
| FR | 2782625 A1 | * | 3/2000 | A47J 27/08 |
| WO | WO-9428778 A1 | * | 12/1994 | A47J 36/08 |

*Primary Examiner* — Drew E Becker
*Assistant Examiner* — Austin Parker Taylor
(74) *Attorney, Agent, or Firm* — Mintz Levin Cohn Ferris Glovsky and Popeo, P.C.

(57) ABSTRACT

A combination cooking system and methods for cooking having a simplified venting structure are provided. In one embodiment, the cooking system can include a housing having a hollow chamber for receiving food, a lid coupled to the housing for enclosing food within the chamber, and at least one heating element. In use, a seal disposed between the lid and housing can be selectively removed to create an air gap there between, thus providing a simplified method for venting air within the housing and thereby enabling the system to operate in different cooking modes. A locking element for locking the lid relative to the housing and/or an adjustable vent can also be selectively used to control venting within the system to enable the system to operate in different cooking modes.

22 Claims, 7 Drawing Sheets

(56) References Cited

U.S. PATENT DOCUMENTS

2020/0315389 A1\* 10/2020 Stewart ................. A47J 27/086
2020/0383522 A1\* 12/2020 Zhou ...................... G01G 19/52
2021/0085128 A1\* 3/2021 Kennedy ................. A47J 36/10
2021/0121011 A1 4/2021 Elliston et al.
2021/0259453 A1\* 8/2021 Newhouse .............. A47J 36/16

\* cited by examiner

FIG. 1

PRIOR ART

FIG. 2

PRIOR ART

VENTING FOR A COMBINATION COOKING SYSTEM

FIELD

The present invention relates to a combination cooking system and methods for cooking having a simplified venting mechanism.

BACKGROUND

Combination cooking systems combine two or more cooking operations into a single device. These systems are capable of cooking food in various convective, conductive, and combination cooking modes. Intake and exhaust vents may be closed or open depending on the mode and the desired amount of humidity to be achieved. For convective cooking modes, a fan is used to circulate hot air around the food being cooked. Some cooking modes such as air frying, broiling, baking/roasting, and dehydrating are traditionally performed in a dry environment. When operating in these modes, moist air created by cooking food can be actively removed from the system through an exhaust vent while fresh, dry air is introduced into the system through an intake vent. Some cooking modes such as pressure cooking, steam cooking, slow cooking, searing, and sautéing rely on a moist environment. In these cooking modes the vents within the system can be configured to retain moisture and improve unit performance.

Accordingly, in order to operate in multiple modes, these systems require unique venting arrangements that can accommodate the appropriate inlet and outlet airstreams necessary for each mode.

SUMMARY

A combination cooking system and methods for cooking are provided having a simplified venting mechanism. In one embodiment, a method for cooking is provided and includes positioning food within a hollow chamber in a housing of a cooking system, removing a seal from one of the housing and a lid coupled to the housing to create an air gap there between, positioning the lid on the housing to cover the hollow chamber, wherein the air gap allows air to flow between the lid and the housing, and activating the cooking system to cause a first cooking operation to be performed in which at least one heating element disposed in the housing heats the food within the hollow chamber.

In one embodiment, removing the seal can include directing a user to remove the seal via a user interface. The method can also include moving at least one vent on one of the housing and the lid to an open position such that air flows through the vent when the at least one heating element is operated. After moving the vent, the method can include activating the cooking system to cause a second cooking operation to be performed in which at least one heating element disposed in the housing heats the food within the hollow chamber.

In other aspects, the method can include directing a user to add water to the hollow chamber. After adding water to the hollow chamber, the method can include activating the cooking system to cause a second cooking operation to be performed in which at least one heating element heats the food within the hollow chamber.

In other embodiment, the method can include replacing the seal within one of the housing and the lid, moving at least one vent on one of the housing and the lid to a partially closed position, and activating the cooking system to cause a combination cooking mode to be performed in which at least one heating element disposed in the housing or the lid heats the food within the hollow chamber.

In yet another embodiment, the method can include replacing the seal within one of the housing and the lid, moving at least one vent on one of the housing and the lid to a fully closed position, and activating the cooking system to cause at least one heating element to heat the food within the hollow chamber.

The method can also include reinstalling the seal onto one of the housing and the lid, positioning the lid on the housing to cover the hollow chamber, and locking the lid to the housing such that a seal is formed between the lid and the housing. With the lid locked to the housing such that a seal is formed between the lid and the housing, the method can include activating the cooking system to cause a second cooking operation to be performed in which at least one heating element heats the food within the hollow chamber. The second cooking operation can be a pressure cooking mode.

In another embodiment, the method can include opening a vent and operating a fan to move heated air throughout the hollow chamber.

The cooking system can operate in various cooking modes. In one embodiment, the first cooking operation comprises a convective cooking mode. In other embodiments, the cooking mode can be a pressure cooking mode or a conductive cooking mode. The least one heating element can include a first heating element positioned in the lid, and a second heating element positioned in the housing.

In yet another embodiment, a method of cooking is provided and includes positioning food in a hollow chamber in a housing of a cooking system, and positioning a lid on the housing to enclose the food within the hollow chamber of the housing. The method further includes activating the cooking system to cause a first cooking operation to be performed in which at least one heating element disposed in at least one of the lid and the housing is activated. During the first cooking operation a seal is disposed between the lid and the housing to prevent airflow there between, and a vent on at least one of the lid and the housing is in a closed position such that a pressure within the hollow chamber reaches at least 40 kPa. The method can further include activating the cooking system to cause a second cooking operation to be performed in which the at least one heating element is activated. During the second cooking operation the seal is removed such that an air gap is formed between the lid and the housing to allow air to flow into and out of the hollow chamber.

In certain aspects, the method can further include opening the vent on at least one of the lid and the housing to a fully opened position prior to activating the second cooking operation. The method can also include operating a fan within the lid to circulate air within the hollow chamber during the second cooking operation.

In other embodiments, the method can include activating the cooking system to cause a third cooking operation to be performed in which the at least one heating element is activated. During the third cooking operation the seal is disposed between the housing and the lid to prevent airflow there between, and the vent is in a partially opened position.

In other embodiment, the method can include instructing a user to add water to the hollow chamber.

In yet another embodiment, a method of cooking is provided and includes positioning food in a hollow chamber in a housing of a cooking system, and positioning a lid on the housing to enclose the food within the hollow chamber of the housing. The method further includes moving a vent having a fully opened configuration, a partially opened configuration, and a closed configuration to the closed configuration, and activating a first heating element located within the housing for a duration of time while the vent is in the closed configuration. The method also includes moving the vent to one of the partially opened and the fully opened configuration, and activating a second heating element located within the lid for a second duration of time while the vent is in the one of the partially opened and the fully opened configuration. The method can also include removing a seal such that an air gap is formed between the lid and the housing to allow air to flow into and out of the hollow chamber.

BRIEF DESCRIPTION OF THE DRAWINGS

The invention will be more fully understood from the following detailed description taken in conjunction with the accompanying drawings, in which.

DETAILED DESCRIPTION

Certain exemplary embodiments will now be described to provide an overall understanding of the principles of the structure, function, manufacture, and use of the devices and methods disclosed herein. One or more examples of these embodiments are illustrated in the accompanying drawings. Those of skilled in the art will understand that the devices and methods specifically described herein and illustrated in the accompanying drawings are non-limiting exemplary embodiments and that the scope of the present invention is defined solely by the claims. The features illustrated or described in connection with one exemplary embodiment may be combined with the features of other embodiments. Such modifications and variations are intended to be included within the scope of the present invention.

Figure 1:
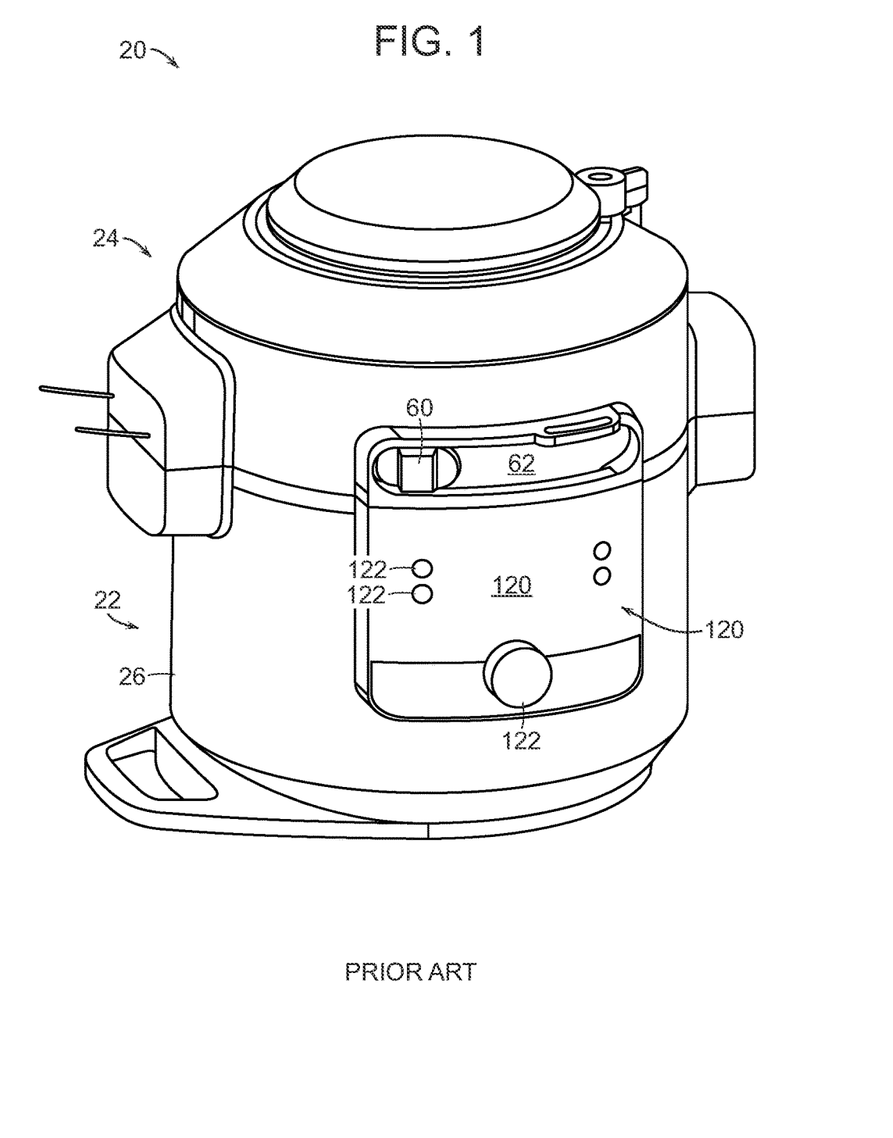
FIG. 1 is a perspective view of a prior art combination cooking system.
Figure 2:
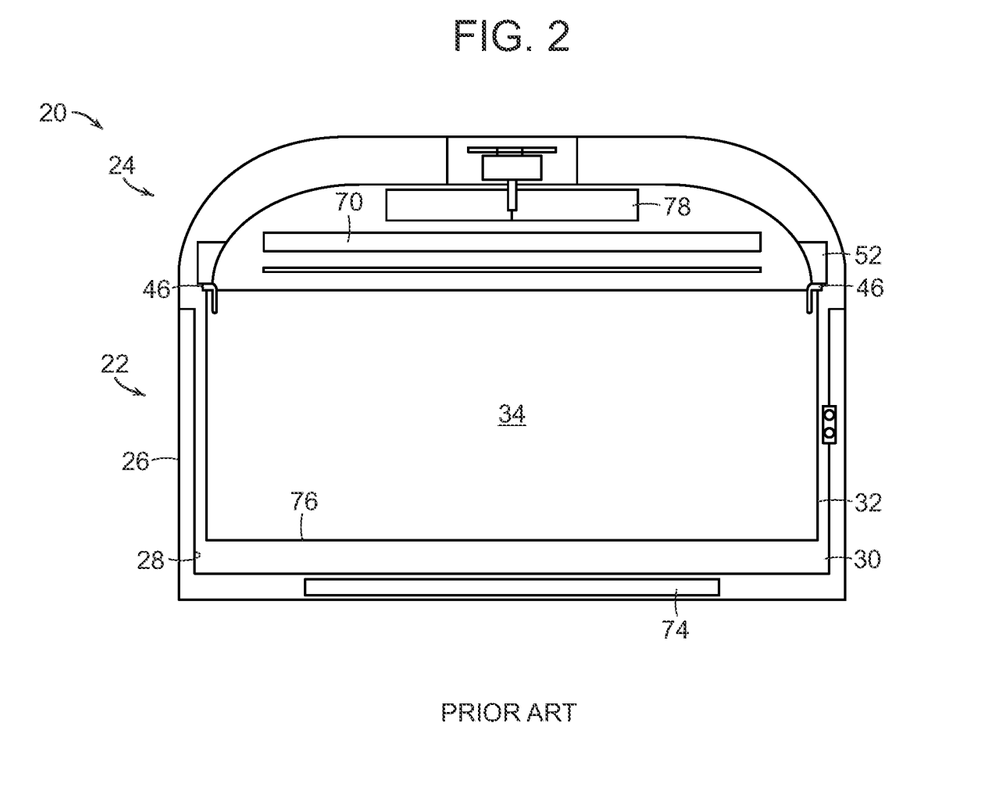
FIG. 2 is a schematic diagram of the prior art combination cooking system of FIG. 1.

FIGS. 1 and 2 illustrate a prior art device operable in a plurality of convective, conductive, and combination cooking modes. Such a device is disclosed in U.S. Patent Application Publication No. 2021/0121011, the disclosure of which is incorporated by reference herein in its entirety. The various cooking modes require different hardware and system configurations in order to achieve a desired result. As illustrated in FIGS. 1 and 2, the cooking system 20 generally includes a base 22 and a lid 24. The base 22 includes a housing 26 with a liner 28 disposed therein and defining a hollow interior 30 of the housing 26. A cooking container 32 is receivable within the hollow interior 30 and defines a cooking chamber 34. The cooking system 20 also includes an air movement mechanism 78, such as a fan, operable to circulate air within a cooking volume when operating in a convective cooking mode. A first heating element 70 is mounted in the lid 24 of the cooking system 20, and a second heating element 74 is disposed within the housing 26, generally adjacent to the bottom 76 of the cooking container 32. A control panel or user interface 120 can be provided on the housing having one or more inputs 122 for selecting and/or initiating a mode of operation of the cooking system 20.

In use, the system 20 creates a "dry cooking environment" within the cooking chamber 34. To create a dry cooking environment, air and moisture are actively exhausted or vented from the cooking enclosure to outside the cooking system 20, thereby maintaining a minimum level of moisture within the container 24. Temperatures associated with the various types of convective/dry cooking modes are between about 100° F. and 475° F. For example, temperatures associated with an air frying operation may be between about 300° F., temperatures associated with a roasting operation may be between about 250° F. and about 400° F., temperatures associated with a dehydrating operation may be between about 100° F. and about 200° F., and a broiling operation may be at a temperature of about 450° F. However, the temperatures provided herein are intended as an example only and it should be understood that any of the cooking modes described herein may be performed at other temperatures.

Wet cooking operations seek to retain moisture within the system for the purpose of using the buildup of steam and water vapor to assist in cooking. These cooking operations include but are not limited to pressure cooking, steam cooking, slow cooking, searing, and sautéing. To create a wet cooking environment the majority of the moisture within the container, i.e. liquid added to the chamber 34 or moisture released from the food within the chamber 34, is retained within the system 20 as the food is cooked. Although during wet cooking operations a minimal amount of air having moisture entrained therein may be vented from the system, such air is passively removed from the cooking enclosure. Pressure cooking as used herein will allow for cooking in a pressurized environment at or above 40 kPa (with a range of 40 kPa to 90 kPa).

The cooking system 20 can operate in another or third cooking mode that functions as a combination of two or more cooking modes or two or more sequences of operation of the fan 78, first heating element 70, and the second heating element 74. In the combination cooking mode, the cooking system 20 is configured to perform a first cooking operation and a second cooking operation sequentially and in response to a single input provided by a user. The combination cooking mode may include more cooking operations or sequences of operation such as a third operation followed by a fourth operation. In one aspect, the first cooking operation may be a steam, slow, or pressure cooking operation utilizing the second heating element 74 and the second cooking operation may involve activating the first heating element 70 and the fan 78. A controller may execute a stored sequence where the second heating element 74 is operated during a first portion of the sequence to perform the first cooking operation and the first heating element 70 and fan 78 are operated during a second portion of the sequence to perform the second cooking operation. Alternatively, the controller may execute a stored sequence where the first heating element 70 is activated for a duration of time followed by activation of the second heating element 74 for the remainder of the cooking cycle. The combination cooking made can include any combination of sequences involving the first heating element 70, the second heating element 74, and the fan 78.

The system 20 of FIGS. 1 and 2 requires various intake and exhaust vents to be opened and closed based on a selected mode of operation. A lid lock 52 in combination with a mode selector 60 is used to adjust the position of an inlet vent and an exhaust vent to control the airflow there through. A user may transform the lid lock between a first configuration and a second configuration by moving the mode selector 60. When the mode selector 60 is adjacent to or in contact with a first side of the opening 62, the lid lock is in a first configuration and either an inlet vent or an outlet vent may be open such that the heating volume is not sealed. Similarly, when the mode selector 60 is arranged adjacent to or in contact with a second, opposite side of the opening 62, and therefore the lid lock 52 is in a second configuration, both the inlet vent and the exhaust vent may be sealed, and as a result, pressure can build within the heating volume. Movement of the mode selector 60 within the opening 62 drives rotation of the lid lock and allows a user to manipulate a sealing surface 46, to selectively form a pressure-tight seal within the system 20. The interior surface of the lid lock 52 may include a ramp-like feature to move a portion of an inlet vent or an outlet vent into a sealing or open configuration based on movement of the mode selector 60.

A combination cooking system is provided herein having a simplified venting structure. The simplified venting structure provides a low cost alternative to complicated venting systems while allowing for cooking in a plurality of modes.

In an exemplary embodiment, the combination cooking system is capable of performing a plurality of cooking operations including dry, wet, and combination cooking modes. These cooking modes can include, but are not limited to, air frying, pressure cooking, broiling, baking/roasting, dehydrating, slow cooking, steaming, searing, sautéing, and/or any combination thereof. These features are achieved in the combination cooking systems discussed below.

FIGS. 3A-3D illustrate a first embodiment of a combination cooking system 300 having a simplified venting arrangement. The system 300 can have a configuration similar to the system 20 shown in FIGS. 1 and 2, and generally includes a lid 301 movable relative to a housing 302 having an opening and an interior chamber. A first heating element and a fan can be mounted within the lid 301. A second heating element (not shown) can be mounted within the housing 302, e.g., at the bottom of the housing. The fan can be used to circulate hot air during a convention cooking mode. A controller may be provided to control the operations of the combination cooking system 300. The controller may operate the fan and the first and second heating elements to achieve desired conditions within the housing 302. A cooking container can be removably positioned within the interior chamber to receive a food item. Examples of food items suitable for use with the cooking system 300 include, but are not limited to, meats, fish, poultry, bread, rice, grains, pasta, vegetables, fruits, and dairy products, among others. The cooking container can be a pot or other container formed from a ceramic, metal, or die cast aluminum material. However, any suitable material capable of withstanding the high temperatures required for cooking food products is contemplated herein. The lid 301 is configured to cover and close the opening of the housing 302. The lid 301 can be attached to the housing 302, for example by a hinge, and can be movable between an open position and a closed position. In other embodiments, the lid 301 can be separate from the housing 302. A person skilled in the art will appreciate that the cooking system can have a variety of other configurations.

Figure 3A:
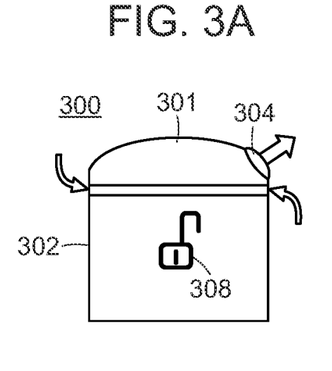
FIG. 3A is a schematic diagram illustrating an embodiment of a combination cooking system having a simplified venting mechanism shown in a first air frying cooking mode.

In order to retain the lid 301 with respect to the housing 302, the lid 301 can include a locking mechanism, schematically illustrated as 308. The locking mechanism 308 allows for the lid 301 to be selectively secured relative to the housing 302 when the lid is in a closed position covering the opening of the housing. The locking mechanism 308 can take the form of a simple latch that is movable to lock the lid 301 to the housing 302, a threaded structure, a bayonet locking mechanism that requires the lid 301, or a portion thereof, to be rotated relative to the housing 302 to intermesh one or more lips or tabs associated with the lid 301 and the housing 302, or any other locking mechanism known in the art. FIG. 3D illustrates an embodiment of a lid having a locking mechanism in the form of a bayonet lock. As shown in FIG. 3D, a plurality of lips or tabs 309 are integrally formed on a rotatable ring 311. Rotatable ring 311 is controlled by a knob or protrusion 310 that moves within a slot or recess 312 in the lid. When a user slides the knob or protrusion 310 from one end of the recess 312 to the other end, the rotatable ring 310 rotates to move the plurality of lips or tabs 309 into engagement or out of engagement with corresponding lips or tabs on the housing, thereby locking and unlocking the lid 301 to the housing 302.

In the illustrated embodiment, the system can also include a removable seal 303, as shown removed from the lid in FIG. 3D. The removable seal 303 is configured to form a pressure tight seal between the lid 301 and housing 302. The removable seal 303 can be a flexible/resilient gasket mounted to an inner portion of the lid 301 or a top portion of the housing 302 such that the seal 303 is engaged between the lid and the housing when the lid is closed. The removable seal 303 can be made of rubber, silicone, or other similar materials and can take the form of a flat ribbon, a round ring, or can include a step or shoulder for fitting into a corresponding groove or recess. When the lid 301 is locked to the housing 302, and the removable seal 303 is positioned there between, a pressure-tight seal is formed between the lid 301 and the housing 302 and a buildup of pressure inside of the housing 302 and the cooking container is possible. When the seal 303 is removed from the system, an air gap is created between the lid 301 and housing 302 into which air can flow into the system or out of the system. While FIG. 3D illustrates the removable seal 303 separated from the lid, as illustrated by arrow 325, the seal 303 can be moved back into the lid when it is desired to form a pressure tight environment within housing 302. In other embodiments, the seal can be configured to be positioned within the housing, rather than the lid.

The combination cooking system 300 can further include an exhaust vent 304. In the illustrated embodiment, the vent 304 has three pre-set positions, namely fully open allowing for most air flow into or out of the hollow interior, partially open allowing for reduced air flow into or out of the hollow interior (relative to the fully open condition), and fully closed with no air flow into or out of the hollow interior. In the fully open position, illustrated in FIG. 3A, the cooking system 300 can function as an air fryer. In this configuration, the locking mechanism 308 can be in an unlocked configuration. The fan in combination with the first heating element positioned in the lid 301 can circulate heated air throughout the housing 302 and food container to cook food items positioned in the food container. Heated air and/or steam can leave the system 300 through the fully opened exhaust vent 304. In order to reduce the humidity in the cooking system further, the removable seal 303 can be removed from the lid 301 or housing 302 to allow for additional air to flow into or out of the system. By removing the seal 303, there is no longer a pressure-tight seal between the lid 301 and housing 302 which allows air to seep therethrough.

Figure 3B:
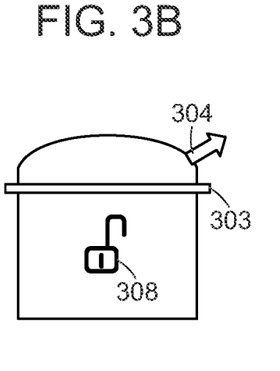
FIG. 3B is a schematic diagram of the combination cooking system of FIG. 3A shown in a second combination cooking mode.

When the exhaust vent 304 is set to the partially opened position, the system 300 can operate in a combination cooking mode as illustrated in FIG. 3B. The combination cooking mode can include a combination of two or more conductive or convective cooking modes, or any sequence of operation of the first heating element mounted within the lid 301, the second heating element mounted within the housing, and the fan mounted within the lid. For example, the system 300 can operate as a steam air fryer that utilizes the fan in combination with at least one of the first or second heating elements. In this mode, the removable seal 303 remains in place. This allows for steam to remain in the cooking chamber in order to raise humidity. In this configuration, the locking mechanism 308 can be in an unlocked configuration.

Figure 3C:
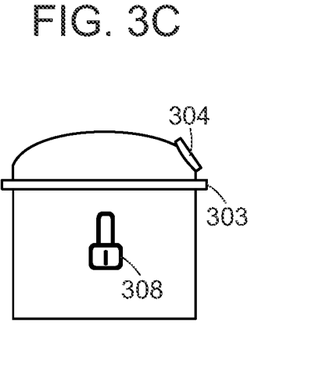
FIG. 3C is schematic diagram of the combination cooking system of FIG. 3A shown in a third pressure cooking mode.
Figure 3D:
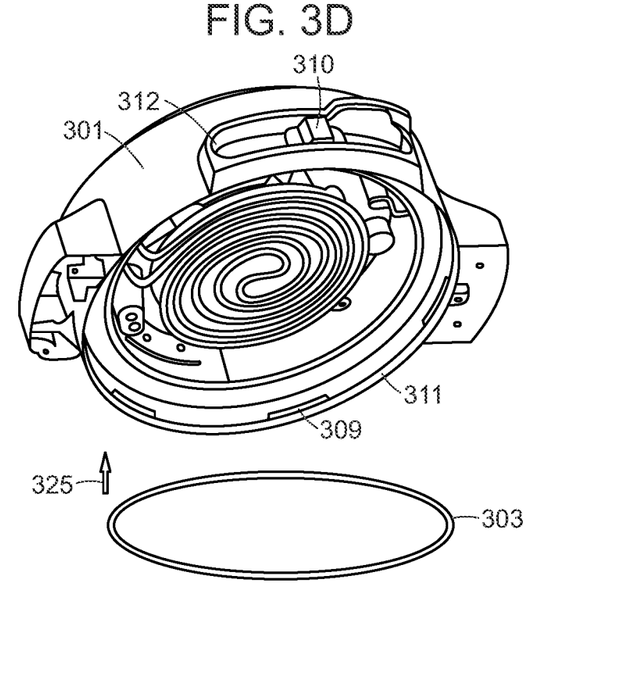
FIG. 3D is a perspective view of an embodiment of a lid having a locking mechanism and a removable seal shown separated from the lid.

In the fully closed vent position, the cooking system 300 can operate in a pressure cooking mode as illustrated in FIG. 3C. In this configuration, the locking mechanism 308 is in a locked configuration, securing the lid 301 to the housing 302. As with the combination cooking mode, the removable seal 303 remains in place to allow the hollow interior to achieve a desired pressure level. In this mode, the fan is not utilized. In a pressure cooking mode, the first heating element is typically not used. However, it may be used to increase the temperature within the housing 302 more quickly in combination with the second heating element.

The position of the vent 304 may be sensed by one or more sensors and can be used to set the various cooking modes. For example, if the vent 304 is determined to be placed in the fully closed position, the controller will allow the system 300 to only operate in the pressure cooking mode. When the vent 304 is set to the partially open position, the controller may allow a user to select a combination mode using an input or user interface. In the partially open position, the controller may instruct a user of the system 300 to add water to increase the humidity within the hollow interior or food container. Additionally, in the fully open position, the controller may instruct a user to remove the removable seal 303 and can only operate in an air frying mode.

Figure 4A:
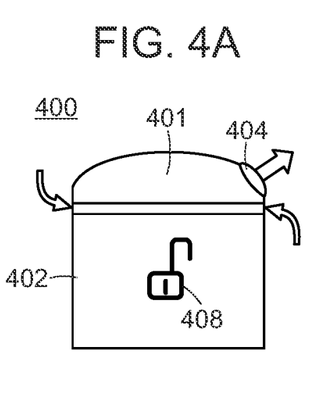
FIG. 4A is a schematic diagram illustrating another embodiment of a combination cooking system having a simplified venting mechanism shown in a first air frying cooking mode.
Figure 4B:
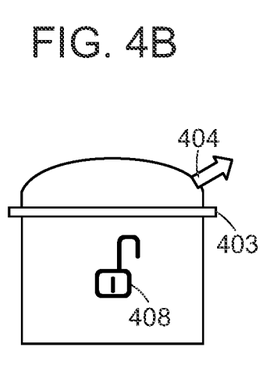
FIG. 4B is a schematic diagram of the combination cooking system of FIG. 4A shown in a second combination cooking mode.
Figure 4C:
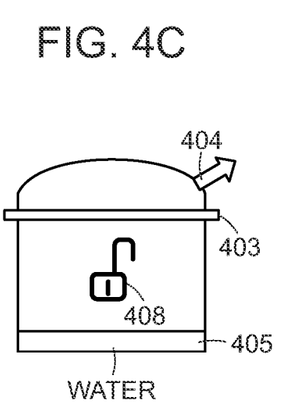
FIG. 4C is a schematic diagram of the combination cooking system of FIG. 4A shown in a second combination cooking mode utilizing additional water in the food container.
Figure 4D:
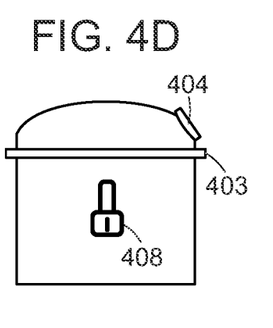
FIG. 4D is schematic diagram of the combination cooking system of FIG. 4A shown in a third pressure cooking mode.

FIGS. 4A-4D illustrate another embodiment of a combination cooking system 400. The illustrated system 400 has the same general components as system 300 discussed above. However, while the embodiment described in FIGS. 3A-3C has a three position exhaust vent 304, the embodiment in FIGS. 4A-4D includes an exhaust vent 404 having only two pre-set position, namely a first open position and a second closed position. In the first open position, shown in FIG. 4A, the system 400 can operate as an air fryer. As shown, the seal is removed to allow for increased air intake and better steam removal. However, the system can operate in air fry mode with the removable seal disposed between the lid and housing and only the vent in the open position to allow air flow therethrough, as shown in FIG. 4B. Alternatively, in the configuration shown in FIG. 4B, the system 400 could operate in a combination cooking mode with the vent open and the seal present. Further, in order to increase humidity within the cooking chamber, a user can be instructed to add water 405 to the food container prior to initiating the combination cooking operation. FIG. 4C illustrates a combination cooking operation where a user has added water 405 to the food container. A user interface can be used to instruct a user to add water 405. For example, a display may flash the words, "ADD WATER." Alternatively, a light or LED may flash repeatedly, or display a specific color to request a user add water to the system before initiating the cooking mode. The determination to add water 405 or to not add water 405 may be made based on the food to be cooked. For example, certain vegetables may be better suited to the use additional steam while some food items may not require additional steam in the combination mode. The system 400 can also be configured to prevent operation until water 405 is sensed in the food container. This may be achieved by one or more sensors associated with the food container. In a further configuration, as shown in FIG. 4D, the system 400 can operate as a pressure cooker with the locking mechanism in the second closed position. When pressure cooking, the lid 401 is locked to the housing 402 by the locking mechanism 408, and the seal 403 is disposed between the lid and housing to form a pressure tight seal there between. Accordingly, similar to the system of FIGS. 3A-3C, the system of FIGS. 4A-4D allows a user to easily switch between different cooking modes by simply moving the vent between two positions and/or adding or removing the seal between the lid and housing.

In another embodiment, illustrated in FIGS. 5A-5E, the system 500 lacks a dedicated exhaust or inlet vent, but includes a pressure relief valve 560 that can be utilized to adjust air flow into or out of the system. While the pressure release valve 560 is configured to automatically open to release air from within the system when the pressure therein exceeds a predetermined threshold, the pressure release valve 560 can also be adjusted manually. The pressure release valve 560 can be rotatable about a vertically oriented axis for example, to release air or fluid from within the heating volume and to remain in an open configuration. In a closed configuration, the pressure relief valve 560 prevents steam (or air and/or other fluids) from leaving the interior of the system 500. In an open configuration, the pressure relief valve 560 allows steam (or air and/or other fluids) to exit the interior of the system 500. While the pressure relief valve 560 is shown disposed in the lid, in other embodiments the pressure relief valve can be disposed on the housing.

Figure 5A:
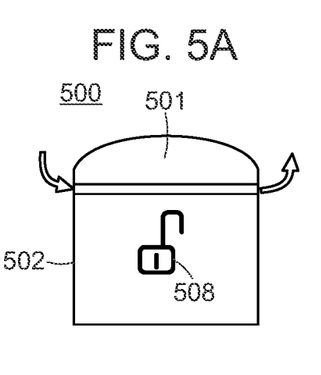
FIG. 5A is a schematic diagram illustrating another embodiment of a combination cooking system having a simplified venting mechanism shown in a first air frying cooking mode.
Figure 5B:
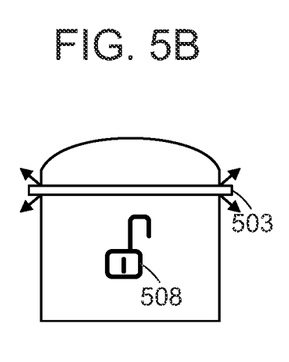
FIG. 5B is a schematic diagram of the combination cooking system of FIG. 5A shown in a second combination cooking mode.
Figure 5C:
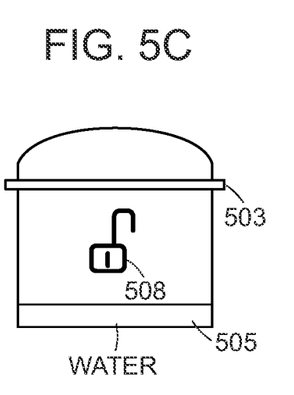
FIG. 5C is a schematic diagram of the combination cooking system of FIG. 5A shown in a second combination cooking mode utilizing additional water in the food container.
Figure 5D:
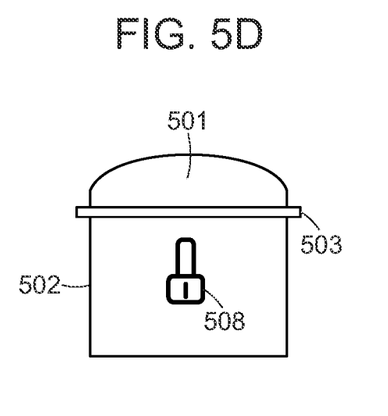
FIG. 5D is schematic diagram of the combination cooking system of FIG. 5A shown in a third pressure cooking mode.
Figure 5E:
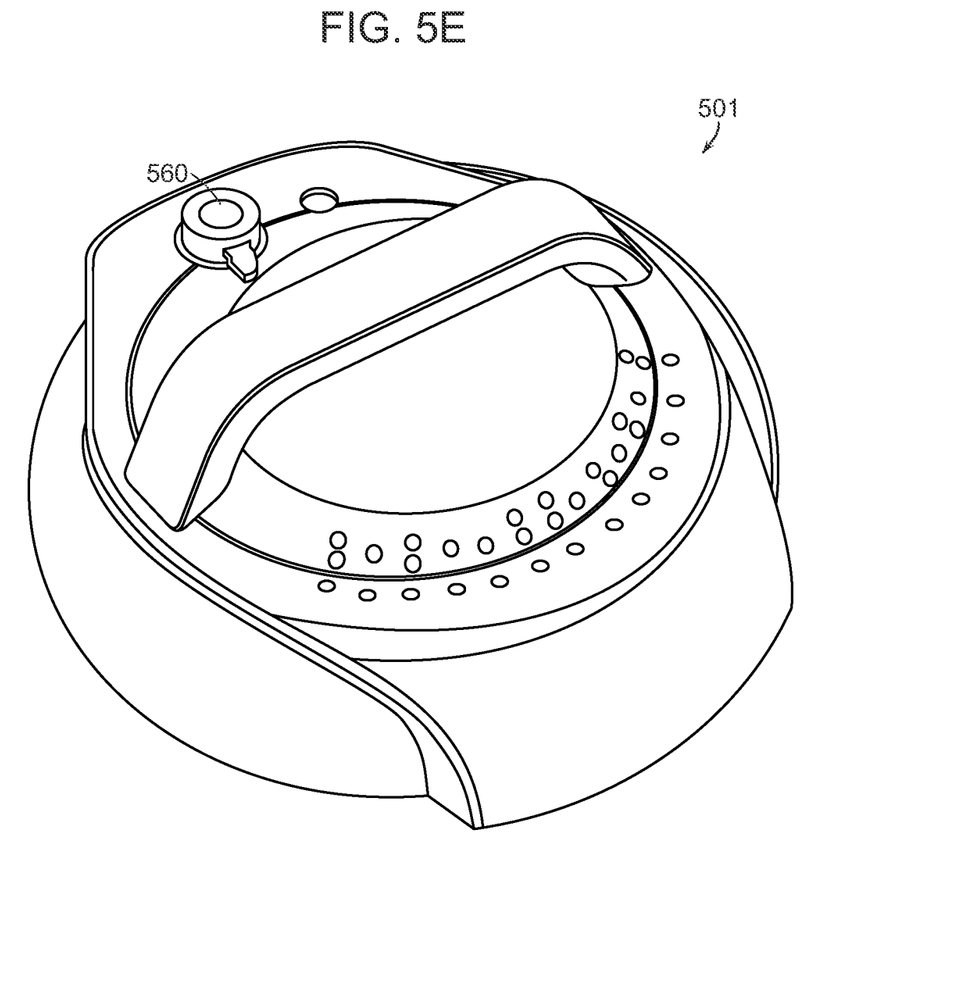
FIG. 5E is a perspective view of an embodiment of a lid having only a pressure relief valve.

In use, the system 500 can operate in a variety of cooking modes. To operate as an air fryer, the lid 501 can simply remain unlocked via a locking mechanism 508 from the housing 502 to allow dry air to enter the system and humid air to leave the system, as shown in FIG. 5A. To increase the amount of air flow, the pressure relieve valve 560 can be manually moved into an open position. Further, as illustrated in FIG. 5A, a pressure seal 503 can be removed in order to allow even more dry air in and more humid air out. In a combination cooking mode, shown in FIG. 5B, the pressure seal 503 can be positioned between the lid and housing, and the lid 501 can remain in an unlocked configuration such that steam can exit the system between the lid and the housing. In some combination cooking modes, the pressure relief valve 560 can be manually opened to increase air flow. Additionally, without additional exhaust or inlet vents, a user may be instructed to add water 505 to the system 500 as illustrated in FIG. 5C to increase humidity in a combination cooking mode. Finally, the system 500 can operate as a pressure cooker, shown in FIG. 5D, when the lid is in a locked configuration via the locking mechanism 508 and the pressure seal 503 is in place. In this configuration the pressure relief valve 560 is manually closed, and will only open upon an increase in pressure above a desired threshold. Other than the safety mechanism provided by the pressure relief valve 560, no inlet or exhaust is needed to operate in a pressure cooking mode.

Figure 6A:
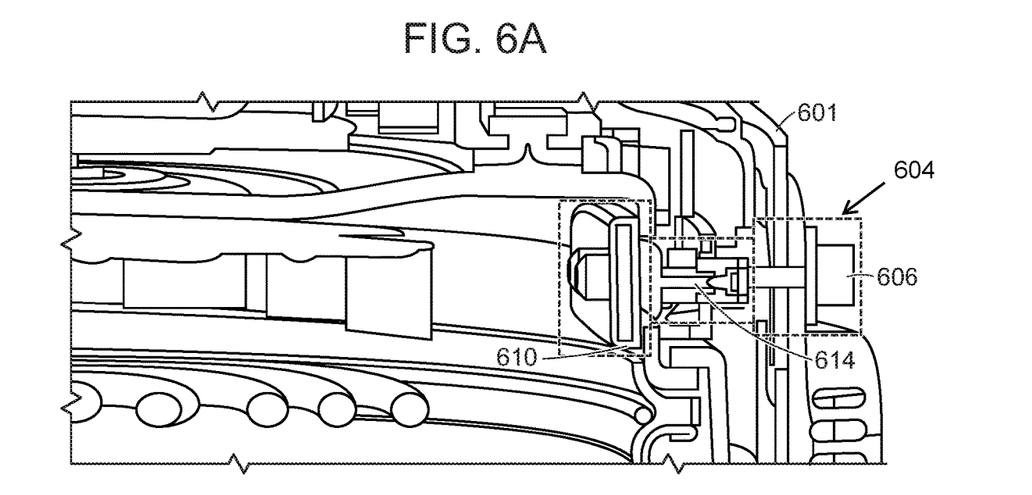
FIG. 6A is a cross-section perspective view showing a portion of an embodiment of a combination cooking system having a push button actuated vent shown in a closed position.
Figure 6B:
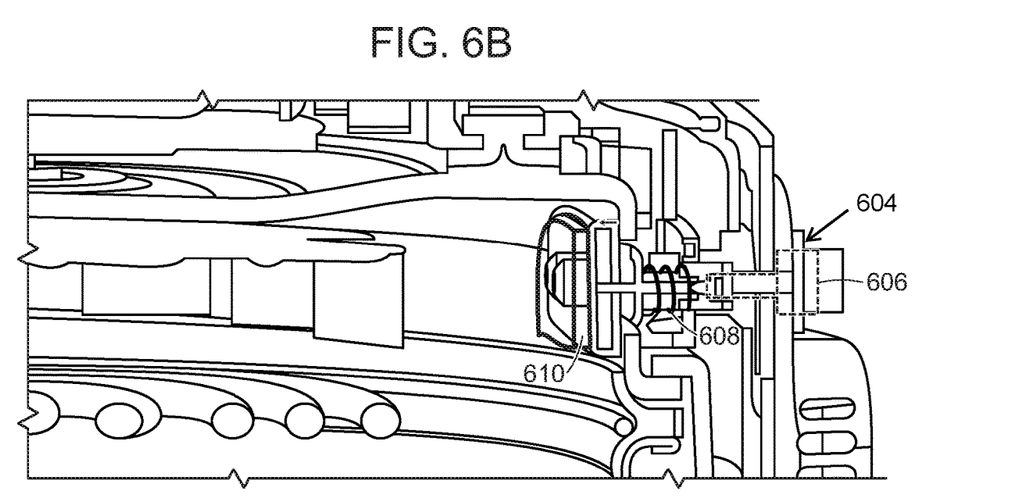
FIG. 6B is a cross-sectional perspective view of the portion of the combination cooking system of FIG. 6A, showing the push button actuated vent in an open position.

As previously indicated, in certain embodiments the system can include a vent movable between various positions. One example of a vent 604 that can be used with the above mentioned embodiments is shown in FIGS. 6A and 6B. As shown in FIG. 6A, the vent 604 includes a button 606 positioned on the outer surface of the lid 601 and a plunger 614 that connects the button 606 to a vent baffle 610. The vent 604 is configured to allow dry air into the system and humid or hot air out. The button 606 is configured to be pressed by a user to move the vent 604 between first and second positions. The vent can be biased into a closed position by a spring 608. When the button 606 is pressed, the spring 608 compresses and the vent baffle 610 is moved away from a vent seal as shown in phantom in FIG. 6B The vent 604 may include a locking mechanism to retain the vent 604 in the second open position. The plunger 614 connected to the button 606 and vent baffle 610 may include a ramp or raised surface configured to rest against a shoulder of a sleeve or opening through which the plunger 614 moves. A portion of the plunger 614 may be configured to rotate to release the ramped surface from the shoulder during further actuation of the button 606. It is understood that while the vent 604 in FIGS. 6A and 6B is shown disposed on the lid 601 and with two pre-set positions, the vent 604 could be placed on another portion of the housing and can be configured to have three or more positions to achieve different amounts of air flow. Further, while a push button vent is described above, it is understood that other types of vents can be used with the embodiments disclosed herein. For example, a pressure plunger may include a rotating lock ring that allows the plunger to move in or out of the lid to adjust the size of an opening. In such an embodiment, the plunger may be stopped at any position to achieve a desired vent opening. Alternatively, the vent may include a hole into the lid which is covered by a sliding member. The sliding member can be positioned at any location over the hole to achieve a desired vent size.

The use of the terms "a" and "an" and "the" and similar referents in the context of describing the disclosure (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the disclosure and does not pose a limitation on the scope of the disclosure unless otherwise claimed. No language in the specification should be construed as indicating any non-claimed element as essential to the practice of the disclosure.

Exemplary embodiments of this disclosure are described herein, including the best mode known to the inventors for carrying out the disclosure. Variations of those embodiments may become apparent to those of ordinary skill in the art upon reading the foregoing description. The inventors expect skilled artisans to employ such variations as appropriate, and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A method for cooking, comprising:
    positioning food within a hollow chamber in a housing of a cooking system;
    removing a seal from one of the housing and a lid coupled to the housing to create an air gap therebetween;
    positioning the lid on the housing to cover the hollow chamber, wherein the air gap allows air to flow between the lid and the housing; and
    activating the cooking system to cause a first cooking operation to be performed in which at least one heating element disposed in at least one of the lid and the housing is activated to heat the food within the hollow chamber and in which air exits the hollow chamber through the air gap.

2. The method of claim 1, wherein removing the seal further comprises directing a user to remove the seal via a user interface.

3. The method of claim 1, wherein the first cooking operation comprises a convective cooking mode.

4. The method of claim 1, further comprising moving at least one vent on one of the housing and the lid to an open position such that air flows through the vent when the at least one heating element is operated.

5. The method of claim 4, further comprising, after moving the vent, activating the cooking system to cause a second cooking operation to be performed in which the at least one heating element heats the food within the hollow chamber.

6. The method of claim 1, further comprising directing a user to add water to the hollow chamber.

7. The method of claim 6, further comprising, after adding water to the hollow chamber, activating the cooking system to cause a second cooking operation to be performed in which at least one heating element heats the food within the hollow chamber.

8. The method of claim 1, further comprising replacing the seal within one of the housing and the lid, moving at least one vent on one of the housing and the lid to a partially closed position, and activating the cooking system to cause a combination cooking mode to be performed in which the at least one heating element heats the food within the hollow chamber.

9. The method of claim 1, further comprising replacing the seal within one of the housing and the lid, moving at least one vent on one of the housing and the lid to a fully closed position, and activating the cooking system to cause a conductive cooking mode to be performed in which the at least one heating element heats the food within the hollow chamber.

10. The method of claim 1, wherein the at least one heating element comprises a first heating element positioned in the lid, and a second heating element positioned in the housing.

11. The method of claim 1, further comprising reinstalling the seal onto one of the housing and the lid, positioning the lid on the housing to cover the hollow chamber, and locking the lid to the housing such that a seal is formed between the lid and the housing.

12. The method of claim 11, further comprising, with the lid locked to the housing such that a seal is formed between the lid and the housing, activating the cooking system to cause a second cooking operation to be performed in which at least one heating element heats the food within the hollow chamber.

13. The method of claim 12, wherein the second cooking operation comprises a pressure cooking mode.

14. The method of claim 1, further comprising opening a vent and operating a fan to move heated air throughout the hollow chamber.

15. A method of cooking, comprising:
positioning food in a hollow chamber in a housing of a cooking system, and positioning a lid on the housing to enclose the food within the hollow chamber of the housing;
activating the cooking system to cause a first cooking operation to be performed in which at least one heating element disposed in at least one of the lid and the housing is activated, wherein during the first cooking operation a seal is disposed between the lid and the housing to prevent airflow there between, and a vent on at least one of the lid and the housing is in a closed position such that a pressure within the hollow chamber reaches at least 40 kPa; and
activating the cooking system to cause a second cooking operation to be performed in which the at least one heating element is activated, wherein during the second cooking operation the seal is removed such that an air gap is formed between the lid and the housing to allow air to flow into and out of the hollow chamber.

16. The method of claim 15, further comprising opening the vent on at least one of the lid and the housing to a fully opened position prior to activating the second cooking operation.

17. The method claim 16, further comprising operating a fan within the lid to circulate air within the hollow chamber during the second cooking operation.

18. The method claim 15, further comprising activating the cooking system to cause a third cooking operation to be performed in which the at least one heating element is activated, wherein during the third cooking operation the seal is disposed between the housing and the lid to prevent airflow there between, and the vent is in a partially opened position.

19. The method of claim 18, further comprising instructing a user to add water to the hollow chamber.

20. The method of claim 15, wherein the at least one heating element comprises a first heating element positioned in the lid, and a second heating element positioned in the housing.

21. A method of cooking, comprising:
positioning food in a hollow chamber in a housing of a cooking system, and positioning a lid on the housing to enclose the food within the hollow chamber of the housing;
moving a vent having a fully opened configuration, a partially opened configuration, and a closed configuration to the closed configuration;
activating a first heating element located within the housing for a duration of time while the vent is in the closed configuration;
moving the vent to one of the partially opened and the fully opened configuration; and
activating a second heating element located within the lid for a second duration of time while the vent is in the one of the partially opened and the fully opened configuration.

22. The method of claim 21, further comprising removing a seal such that an air gap is formed between the lid and the housing to allow air to flow into and out of the hollow chamber.

* * * * *